United States Patent

[11] 3,539,064

| [72] | Inventor | S. Carroll Kahn, Jr.<br>3333 N. Franklin Road, Indianapolis, Indiana 46226 |
|---|---|---|
| [21] | Appl. No. | 777,523 |
| [22] | Filed | Aug. 23, 1968 |
| [45] | Patented | Nov. 10, 1970<br>Continuation of Ser. No. 504,761, Oct. 24, 1965, abandoned. |

[54] METHOD OF STORING AND RETRIEVING ARTICLES BY CONTINUALLY USING PIN TAGS AS A CONTROL INDICATOR
8 Claims, 7 Drawing Figs.

| [52] | U.S. Cl. | 214/152, 214/16.4 |
|---|---|---|
| [51] | Int. Cl. | B65g 1/00 |
| [50] | Field of Search | 214/16.4, 16B, 16.42, 152, 11; 186/1.2 |

[56] References Cited
UNITED STATES PATENTS

| 2,071,770 | 2/1937 | Shield | 186/1.2 |
| 3,033,392 | 5/1962 | Baumann et al. | 214/16.4 |
| 3,049,247 | 8/1962 | Lemelson | 214/16.4 |
| 3,263,777 | 8/1966 | Robichon | 214/16.4 |
| 3,343,692 | 9/1967 | Arnot | 214/16.4 |

FOREIGN PATENTS

| 982,148 | 2/1965 | Great Britain | 214/16.4 |

Primary Examiner—Gerald M. Forlenza
Assistant Examiner—Raymond B. Johnson
Attorney—Woodard, Weikart, Emhardt & Naughton ABSTRACT: A method of storing and retrieving goods wherein goods are put into shelves from the rear thereof and pulled to fill an order from the front of the shelves. The truck used to pull the order moves from one end of the rack toward the other while simultaneously pulling the desired objects from the upper shelves of the rack onto the truck and then moves back toward the one end while simultaneously pulling the further desired objects from the lower shelves of the rack. Pin tags are used with the goods as they come in to identify the shelf to which they are assigned. When the shelf becomes empty the pin tag is returned to the location where incoming goods are received and the next goods received are given that pin tag and assigned to that shelf whether or not those next goods are the same type of goods previously assigned to that slot.

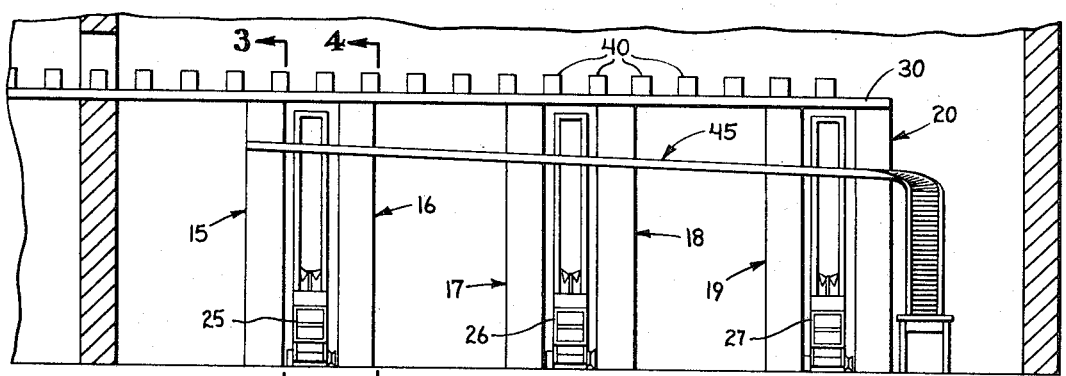
Fig. 2.
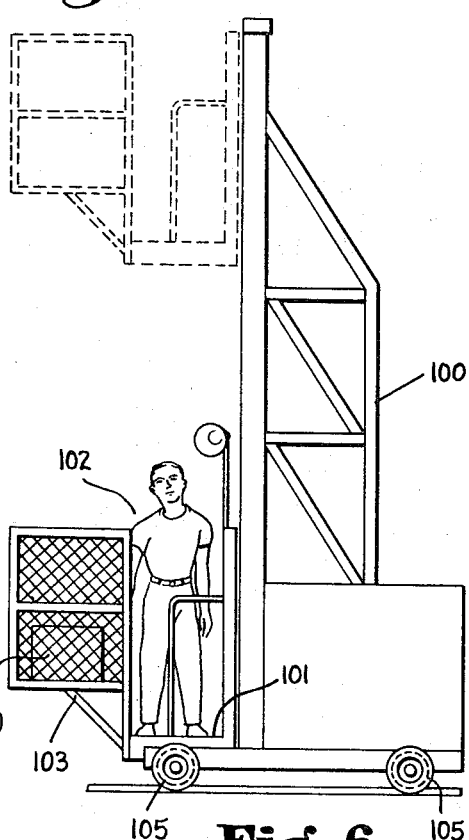
Fig. 6.
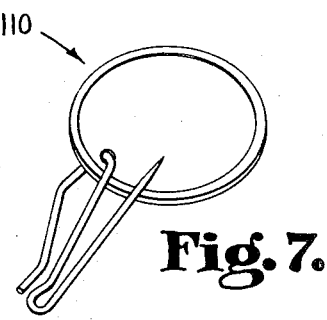
Fig. 7.
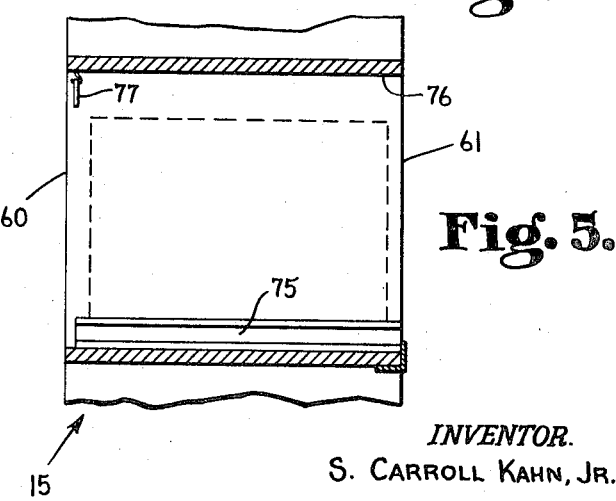
Fig. 3.
Fig. 4.
Fig. 5.
INVENTOR.
S. CARROLL KAHN, JR.

3,539,064

METHOD OF STORING AND RETRIEVING ARTICLES BY CONTINUALLY USING PIN TAGS AS A CONTROL INDICATOR

CROSS REFERENCES TO RELATED APPLICATIONS

This application is a continuation of application Ser. No. 504,761 filed Oct. 24, 1965 and now abandoned.

BACKGROUND OF THE INVENTION

The present invention relates to a method of storing and retrieving goods.

It is present practice in many distributing houses to store goods in a fixed location in a rack or set of bins. When the goods become depleted to the point that no further orders can be filled, additional goods are ordered for that particular location in the rack or that particular bin. It can be appreciated that such a system of storing goods results in the bin being on-the-average half empty. Such a condition is expensive and should be avoided, if possible, because empty storage space is wasted storage space. Even if some sort of reorder system is put into effect for reorder prior to the rack or bin becoming empty, difficulty is encountered because the reordered goods may not be received at the distributing house for a period of time. Also, if the amount of the reorder is increased in an attempt to compensate for the waiting time, there is the possibility that the amount of goods received will be too great to fit into the assigned rack or bin. Consequently, one object of the present invention is to provide an improved method of storing and retrieving goods whereby rack and bin space is saved.

Another object of the invention is to provide a method of storing and retrieving goods whereby the time required to assemble an order is substantially reduced.

Further objects of the invention are to provide a method of storing and retrieving goods which permits faster receiving, storing and disbursing; to provide a method of storing and retrieving goods which makes possible greater accuracy in assembling an order, to provide a method of storing and retrieving goods which permits more accurate inventory control, and to provide a method of storing and retrieving goods which requires less skilled labor and less labor of all kinds than prior art methods.

Related objects and advantages will become apparent as the description proceeds.

The present invention uses the floating slot system. That is, whenever a slot or shelf or bin becomes empty and thus available for more goods, the next goods received are assigned to that slot whether or not those next goods are the same type of goods previously assigned to that slot. The method of the present invention in one embodiment thereof may further include numbering the individual upper shelves in a rack from one end of the rack to the other in progressively increasing order and the individual lower shelves in the rack from the other end of the rack to said one end thereof continued in progressively increasing order, placing different objects in the shelves, assembling an order by moving a lift truck from said one end of the track towards said other end and simultaneously pulling the desired objects from the upper shelves onto the truck, and moving the lift truck back toward said one end and simultaneously pulling the further desired objects from said lower shelves onto the truck.

The full nature of the invention will be understood from the accompanying drawings and the following description and claims.

FIG. 2 is a vertical section taken generally along the line 2–2 of FIG. 1 in the direction of the arrows.

FIG. 3 is a vertical section taken along the line 3–3 of FIG. 2 in the direction of the arrows.

FIG. 4 is a vertical section taken along the line 4–4 of FIG. 2 in the direction of the arrows.

FIG. 5 is a vertical section taken along the line 5–5 of FIG. 1 in the direction of the arrows.

FIG. 6 is a side elevation of a lift truck used in the method of the present invention.

FIG. 7 is a perspective view of a tag used for identifying goods in the method of the present invention.

Figure 1:
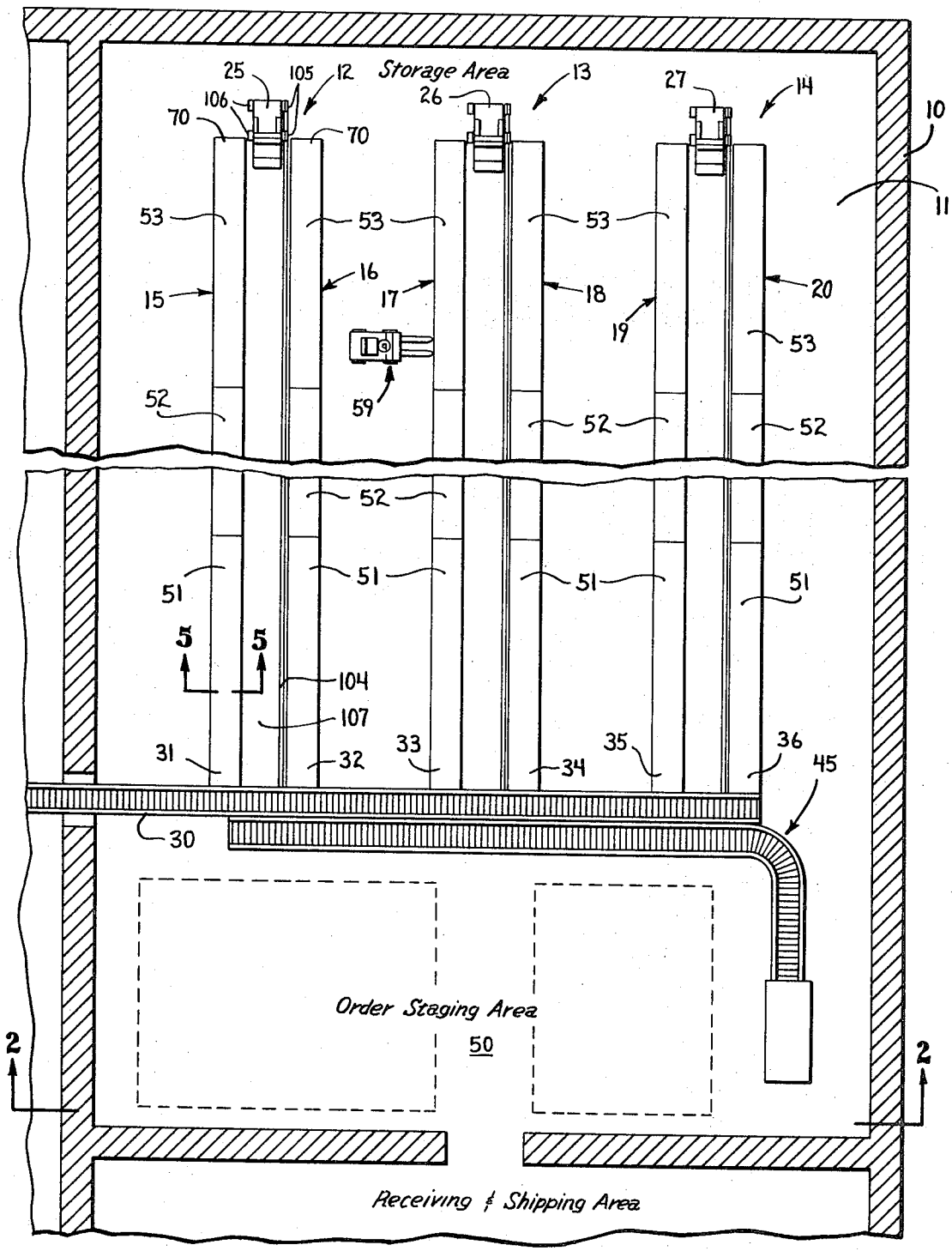
FIG. 1 is a top plan view of a rack system embodying the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, FIG. 1 is a plan view of a building 10 including a room 11 within which are arranged three rows 12, 13 and 14 of racks 15, 16, 17, 18, 19 and 20. The first pair of racks 15 and 16 have a lift truck 25 which operates therebetween while the second pair of racks 17 and 18 and the third pair of racks 19 and 20 are provided with the respective lift trucks 26 and 27 operating therebetween. A conveyor 30 is provided which extends across the upper portion of the building and adjacent the ends 31—36 of the respective racks 15—20. The conveyor 30 functions to convey empty boxes 40 to locations adjacent the ends 31—36 of racks 15—20. The boxes 40, which are used to assemble orders from goods in the racks 15—20, can then be conveniently placed onto the lift trucks 25, 26 and 27 by the operators of the lift trucks. The conveyor 45 is used to receive the filled boxes from the lift trucks 25, 26 and 27 and to convey those filled boxes into the order-staging area 50.

One-third of the goods that are in the rack system are stored in the racks 15 and 16 while a second third is stored in the racks 17 and 18 and the final third in the racks 19 and 20. Thus, in order to assemble a complete order, it is in many cases necessary to have boxes from each of the lift trucks 25, 26, and 27.

Each of the racks 15—20 is divided into three portions or areas which may be designated by colors such as red, green and yellow and which are here designated by numerals 51, 52 and 53. The numeral 51 designates an area for goods which are ordered the most frequently. The numeral 52 designates an area for goods which are ordered with intermediate frequency and the numeral 53 designates an area for goods which are ordered least frequently. Of course, more or less of the areas 51, 52 and 53 can be provided, as desired, for example, four or two such areas. Between the rows 12 and 13 and between the rows 13 and 14 as well as outside of the rows 12 and 14, a further lift truck 59 is movable for loading goods into the rear of the respective racks. Referring to FIG. 5 which illustrates a representative one of the racks, goods are always loaded from the rear side 60 and are always withdrawn from the front side 61 of the respective racks.

One of the most important features of the present invention is the numbering system of the racks. Referring now to FIGS. 3 and 4, FIG. 3 shows the numbering of the respective shelves in a rack as the numbering would appear to the lift truck driver of any of the lift trucks 25, 26 or 27. The numbering of FIG. 3 is the proper numbering for any of the racks 15, 17 or 19; however, rack 15 will be described as representative. It will be noted that the numbering of the shelves begins at the left-hand side toward the end 31 of the rack which is adjacent the conveyor 30 upon which the empty boxes 40 move to the racks. The three digits of the shelf numbers increase progressively from the end 31 of the rack down to the other end 70 thereof. The last digit in the number which appears after the hyphen is even to indicate the even side of the row 12. Thus, all the shelves in the racks 15, 17 and 19 have even numbers after the hyphen to indicate the even side of the rows 12, 13 and 14, respectively. The rack 16 directly opposite to the rack 15 (as well as racks 18 and 20) are numbered similarly to the numbering of the rack 15 with the exception that the last number after the dash is odd to indicate the odd side of the respective row 12, 13 or 14. Thus, FIG. 4 shows the rear side of the rack 16, that is, the side into which goods are loaded by means of the truck 59. An additional digit (not shown) is used and appears in front of the above mentioned three digits in order to designate the proper row or pair of racks.

It will be noted that the upper half 71 (FIGS. 3 and 4) of each rack is the area in which the numbering system starts. The shelves are numbered from the end 31 of the rack 15 to the end 70 in progressively increasing order, also the shelf numbers in the lower half 72 of the rack increase from the end 70 of the rack to the end 31. The shelf numbers in the lower half 72 of the rack are greater than the shelf numbers in the upper half. Unused numbers are left between the number 168 and the number 233 in order to provide for additional shelf space and for elongating the racks if desired. In the illustrated embodiment, however, number 233 is the next higher number from the number 168 and the shelf numbers in the lower half of the rack increase from the number 233 at the end 70 of the shelf to the number 280 at the forward end 31 of the rack. The numbering system of each of racks 17 and 19 is identical. The numbering system of racks 16, 18 and 20 is identical with the exception that the last number after the hyphen is odd to indicate the odd side of the respective rows 12, 13 and 14. The last number after the hyphen also is chosen depending upon the distance from the bottom of the rack upper half or lower half. Thus, the lowest shelf is designated 1 while progressively higher shelves have progressively higher numbers. If desired, some of the shelves such as 280-3 and 280-5 can be smaller than other shelves such as 280-1.

Referring to FIG. 5, goods are moved into the various racks on pallets 75 carried by the lift truck 59. The goods are so arranged on the pallets that they extend upwardly only a sufficient distance that they clear the lower surface 76 of the next shelf above by a sufficient distance to allow the tags 77 designating the respective shelves to hang freely and to be visible to the operator of the trucks 25, 26 or 27 on the unloading or order filing side of the racks. Each tag 77 is attached to one of the racks and hangs in a respective shelf. Each tag 77 is preferably a bright metal plate which carries the identification numeral for the shelf and is printed with this shelf number on both sides of the tag so that it is not only visible to the operator of the truck 59 loading the pallet into the shelf, but also to the operator of the truck 25, 26 or 27.

In using the method of the present invention, goods may be acquired by a distributing house by the use of a purchase order. The color designations corresponding to the areas 51, 52 and 53 of each rack, are placed on the purchase order when the purchase order is written. Then, when the shipment is received and counted, a pin tag 110, as shown in FIG. 7, is put on each pallet unit of any single item, the pin tag being the same color as indicated on the receiving copy of the purchase order. There is one properly numbered pin tag provided for each slot or shelf opening in the racks 15—20. Thus, the item is properly numbered for the slot opening or the shelf opening to which it is assigned by means of the pin tag. The pallet unit 75 is then picked up by the stock man operating the lift truck 59 and is placed into the assigned shelf. Of course, additional trucks 59 may be provided if needed. The pin tag of FIG. 7 is attached to the order-picking side of the pallet unit (on the side 61 of the rack FIG. 5) and stays there for later processing by the order picker on the lift truck 25, 26 or 27.

A slot location slip showing the line (item) numbers and assigned slot numbers is made out by the control center and provided to the stock man to guide him in loading the racks. The slot location slip is returned to the control center after being signed by the stock man as certifying that the goods have been placed in the assigned slot. The slot location slip is then sent to the data processing area for entry as new goods ready to be shipped. All merchandise is identified by a line number or a goods identification number for the various purchasing, receiving, data processing and sales departments. The warehouse identifies the same merchandise, however, by the slot number location at the time that the order is called for. The order picker on one of the lift trucks 25, 26 or 27 receives the order-picking copy of the invoice which has the various items ordered listed thereon in numerical slot sequence. It will be appreciated, therefore, that the picking of an order is accomplished in numerical order beginning at the front and top of the rack 15 or 16 and proceeds on toward the back of the rack thence downwardly and along the bottom of the rack back to the front again. Of course, items will be picked from the racks on both sides of the row, for example, both rack 15 and rack 16 as this process is carried out. In order to make it possible for the operator of the lift truck 25 to pick goods which are high up in the shelves as well as low down a special lift truck is provided as illustrated in FIG. 6. Since the details of this lift truck do not form a part of the present invention, the lift truck will be described only in sufficient detail as to make clear its function in the process of the present invention. A suitable lift truck, capable of providing the required performance is manufactured by Barrett-Cravens Company of Northbrook, Illinois and is commercially available.

Referring to FIG. 6, the lift truck of the present invention involves a frame 100 on which is mounted for vertical movement a carriage 101 upon which the operator 102 rides. The carriage 101 has fixedly mounted thereon a box supporting assembly 103 within which the empty boxes 40 are placed after they are taken off the conveyor 30. The frame 100 has mounted thereon V-groove guide wheels 105 which ride along a track 104 on one side of the aisle between the racks 15 and 16. On the underside there is provided a traction which powers the lift truck as it moves from one end of the aisle 107 to the other.

It will be appreciated, therefore, that the present process is accomplished by picking goods beginning at the forward end 31 and 32 of the racks 15 and 16 and picking those goods high up adjacent the box conveyor 30. The operator of the lift truck then moves toward the ends 70 of the racks 15 and 16 but may not reach those ends because of the fact that the goods in the area 53 of each of the racks are relatively infrequently ordered. When the operator has gone toward the end 70 as far as is necessary to complete the order which he has set forth on his order-picking copy of the invoice, he moves downwardly to the lower portion of the racks and thence back to the end 31 and 32 of the rack completing the picking of his order. The box with the order therein is then placed upon the conveyor 45 and it moves into the ordering-staging area. Since the conveyor 45 is somewhat above the lower portion of the racks, it will be necessary for the operator to raise up to discharge his filled order. Next the operator goes up to pick up an empty box or boxes and repeats the above procedure.

As mentioned above, each of the lift trucks 25, 26 and 27 picks a portion of the order. The items that are on each row 12, 13 and 14 have been broken down in the data processing department of the distributing house and only items on each row are printed on the order-picking copy for that row. All parts of the same order are numbered alike so that all parts of the complete order are sent to the same assembly line in the staging area 50.

While the operator 102 of the lift trucks 25, 26 and 27 is picking orders, shelves or slots are emptied or exhausted of their last item. Whenever this occurs, the operator 102 removes the pin tag 110 (FIG. 7) and places it in a basket provided at 31. The pin tags collected in the basket for each row 12, 13 and 14 are compared with a slot stock out list prepared by the data processing department showing which slots or shelves are empty according to records. Assuming that the pin tags check properly with the slot stock out list, they are sent to the pin tag board in the receiving area for use on new goods coming in. It can be understood, therefore, that any slots can receive any type of merchandise as long as the color coding or frequency of order is proper.

The method of the present invention can be carried out by other apparatus than that disclosed herein. For example, the lift trucks 25, 26 and 27 and of FIG. 6 can be completely automatic and controlled by a punched card. The card is punched with information designating how many items are to be pulled from each slot and designating which slots are to be pulled from. Empty boxes 40 are automatically picked up from the conveyor 30, automatically filled with orders and automatically discharged on the conveyor 45. The benefits of the method of the present invention are still present, however, in that the lift trucks need not always travel into the areas 53 or very far into the areas 53. Also goods are continuously picked whether the lift truck is traveling away from or toward the conveyors 30 and 45.

It will be evident from the above description that the present invention provides an improved method of storing and retrieving goods whereby the time required to assemble an order is substantially reduced. It will also be clear that the present invention provides a method of storing and retrieving goods which reduces labor, increases accuracy and reduces wear and tear on equipment.

I claim:

1. In a warehouse system with article receiving and article order assembly areas, at least one storage rack having a plurality of horizontally and vertically disposed shelves, loading and unloading means adapted to deliver articles to the shelves for depositing articles therein and adapted to transport articles retrieved from the shelves to the order assembly area, the method of:
   a. dividing the rack into areas to store groups of preselected articles in accordance with the frequency of demand of the articles;
   b. numbering the shelves in each of said areas in a separate arithmetic progressive order;
   c. providing a pin tag for each shelf in each area, and recording the number of the shelf on the pin tag;
   d. assembling groups of articles in the receiving area and placing one of said pin tags on each group;
   e. conveying the groups of articles by said means to the shelves recorded on the respective pin tags;
   f. placing the groups of articles with the pin tags thereon in the shelves corresponding to the numbers recorded on the pin tags;
   g. collecting articles from the groups of articles in the shelves and collecting the pin tags when the respective corresponding shelves become empty;
   h. transporting the collected articles to the order assembly area by said means and transporting the pin tags representing empty shelves to the article receiving area and repeating the aforestated steps with the same pin tags.

2. The method of claim 1 wherein the pin tags and the corresponding selected area of the rack is provided with a common color.

3. The method of claim 1 wherein the storage area with the highest frequency of demand is located the least distance from the order assembly area.

4. The method of claim 1 wherein said order assembly area is located adjacent one end of said rack and said pin tags are colored according to the closeness of their areas to said one end and in which the color of a pin tag placed on a group of articles is selected according to its frequency of retrieval with objects of greatest frequency of retrieval being placed closest to said one end.

5. The method of claim 1 wherein said placing of pin tags on groups of articles is at random and without any requirement that a pin tag and its corresponding slot always be used for a particular type of article.

6. The method of claim 5 wherein said warehouse system includes at least one additional storage rack having a plurality of horizontally and vertically disposed shelves, said racks being parallel and spaced from one another, said random placing causing the use of all of said racks in placing and collecting to be with approximately equal frequency.

7. The method of claim 1 wherein said loading and unloading means comprises separate loading means and unloading means, and said shelves have a loading side and an unloading side, said collecting of articles being accomplished from the unloading side of the shelves and said placing of groups of articles being accomplished into the loading side of the shelves.

8. The method of claim 1 wherein said collecting and transporting is accomplished by intermittent start-and-stop movements of said means from one end of the rack toward the other end thereof and during stops collecting the desired articles from a first group of said shelves of the rack and by intermittent start-and-stop movements of said means back toward said one end and during stops collecting further desired articles from a second group of said shelves of the rack, one of said groups of shelves being above the other of said groups of shelves.